March 29, 1966     B. H. BILLINGS     3,243,722

MASER FREQUENCY CONTROL SYSTEMS USING REFRACTIVE INDEX CHANGE

Filed Aug. 28, 1961

INVENTOR.
BRUCE H. BILLINGS
BY
Morse & Altman
ATTORNEYS

United States Patent Office 3,243,722
Patented Mar. 29, 1966

3,243,722
MASER FREQUENCY CONTROL SYSTEMS USING REFRACTIVE INDEX CHANGE
Bruce H. Billings, Lincoln, Mass., assignor to Baird-Atomic, Inc., Cambridge, Mass., a corporation of Massachusetts
Filed Aug. 28, 1961, Ser. No. 135,104
10 Claims. (Cl. 331—94.5)

The present invention relates to the generation and amplification of electromagnetic radiation by stimulated emission in devices called masers and, more particularly, to controlling the frequency of masers (including lasers), as in radar applications where extremely stable frequency is required or communication applications where frequency modulation is desired.

A characteristic component of a maser is a medium in which there is established at least intermittently a nonequilibrium population distribution in a pair of spaced energy levels of its energy level system. In particular, the population of the higher of the selected pair of energy levels may be made considerably larger than that of the lower. It is usual to describe a medium that is in such a state of nonequilibrium as exhibiting a negative temperature. It is known that a competing process known as relaxation spontaneously tends to return the population distribution to equilibrium. If there be applied to a medium in a negative temperature state a signal of a frequency satisfying Planck's law with respect to the two energy levels in nonequilibruim, i.e. frequency is equal to the energy difference between the levels divided by Planck's constant ($f=E_2-E_1/k$), then the applied signal will stimulate the emission of radiation in the form of an amplified signal.

Various forms of negative temperature media having a system of three energy levels have been proposed. These three energy levels may be referred to as $E_1$, $E_2$ and $E_3$ for lowermost, middle and uppermost, respectively. Generally, each of levels $E_1$ and $E_2$ corresponds to a relatively narrow energy range. Accordingly, transitions between levels $E_2$ and $E_1$ produce radiation of frequencies within a narrow band. In contrast, level $E_3$ corresponds to a relatively broad energy range. Because transitions between levels $E_3$ and $E_2$ correspond to differing frequencies of relatively low energy, resulting radiation is not significant. Such a three energy level system operates in a maser as follows. First the system is supplied with pumping power, which causes transitions from level $E_1$ to $E_3$. In consequence transitions occur spontaneously from level $E_3$ to level $E_2$. When the number of atoms at level $E_2$ is much larger than the number at level $E_1$, a so-called negative temperature exists by which maser action is possible. Finally radiation of appropriate frequency stimulates transitions from level $E_2$ to level $E_1$ by which increased radiation of this frequency results.

Because the stimulated emission corresponding to the drop level $E_2$ to level $E_1$ is characterized by a band of frequencies, it is desired that (what may be considered) a single frequency be isolated. A so-called Fabry-Perot system has been proposed as a resonator for isolating such a single frequency. This system provides a pair of spaced parallel plates, at least one of which is partially reflecting-partially transparent and between which the negative temperature medium is placed. The longitudinal periphery of the negative temperature medium is transparent to or absorptive of pumping or other radiation. The precise wavelength of the radiation emitted through the partially reflecting-partially transparent plate is determined by the separation of the plates. For example, the wavelength in the case of a ruby maser medium is close to 6900 A. The natural band width associated with the transition from $E_2$ to $E_1$ in the case of normal fluorescence of this medium is several thousand megacycles. This width is determined by acoustical and thermal vibrations of the crystal lattice.

The emission from the Fabry-Perot resonator will consist of a series of sharp lines, the frequencies of which are within the envelope of the normal width of the $E_2$ to $E_1$ transition. The formula for the frequency emitted by the maser is given by the expression $f=cm./2nd$; where $c$ is the velocity of light, $m$ is the number of half wavelengths contained in the cavity, $n$ is the index of refraction of the negative temperature medium material and $d$ is the distance between the Fabry-Perot plates. One of the problems encountered in the operation of such a maser is undesired frequency drift of the emitted radiation. Because of temperature expansion of the negative temperature medium, for example, the effective Fabry-Perot plate separation may change. From the foregoing formula, it is seen that an increase of separation $\Delta_1$ will result in a frequency shift given by the following formula:

$$\Delta f = -cm\Delta_1/2nd^2$$

In the ideal maser communication system, the receiver as well as the transmitter should be a maser. Such a system makes possible an extraordinarily low noise level associated with background illumination. One consideration responsible for this low noise level is that although the production of such radiation would be high, here the actual temperature is low. In other words although the effective temperature of the maser radiation can be high, the actual energy in the beam can be quite small. However, in order to operate a maser detector, it must be very precisely tuned in frequency to the transmitter. This would mean holding Fabry-Perot plates of the aforementioned type to an accuracy of one part in perhaps $10^5$. In summary, in a maser unit of the foregoing type, the effective optical path between the Fabry-Perot plates may be held constant in order to keep the output frequency steady or may be varied in order to modulate the output frequency.

The primary object of the present invention is to control the effective optical path between the plates of a resonant cavity of the foregoing type by interposing between the plates and in series with the maser medium an auxiliary medium, the index of refraction of which can be varied by some external means. It will be appreciated that a variation of index of refraction constitutes a variation in effective path length between the Fabry-Perot plates. One particularly useful material, for example, exhibits the Pockels effect by which index of refraction may be controlled by an applied electric field.

Other objects of the present invention will in part be obvious and will in part appear hereinafter.

For a fuller understanding of the nature and objects of the present invention, reference should be had to the following detailed description, taken in connection with the accompanying drawing, wherein.

Generally, each of the embodiments of the present invention disclosed herein is a system having (1) a maser unit comprising a negative temperature medium and what may be termed a tuning medium in series, (2) Fabry-Perot plates presenting parallel surfaces at opposite extremities of the maser unit and (3) a source for pumping energy into the negative temperature medium. The negative temperature medium, for example, may be: a gas such as an alkali metal gas containing lithium, sodium, potassium, rubidium or cesium or mixtures thereof; or a solid for example an anhydrous chloride of europium or samarium, or doped paramagnetic salt composed of 1% gadolium ethyl sulfate, approximately 1/20 of 1% cerium ethyl sulfate and the remainder lanthinum ethyl sulfate. The tuning medium, for example, is a primary ammonium phosphate having a pair of parallel optical surfaces substantially perpendicular to the Z-axis, for example, primary potassium phosphate and primary rubidium phosphate. Such negative temperature materials are described in: U.S. Patent Nos. 2,929,922, issued Mar. 22, 1960 in the name of A. L. Schawlow et al.; 2,976,492, issued Mar. 21, 1961 in the name of H. Sidel; and 2,981,894, issued Apr. 25, 1961 in the name of H. E. Scovil. Such tuning materials are described in U.S. Patent No. 2,463,109, issued Mar. 1, 1949 and 2,616,962, issued Nov. 4, 1952, both in the name of Hans Jaffe.

Figure 1:
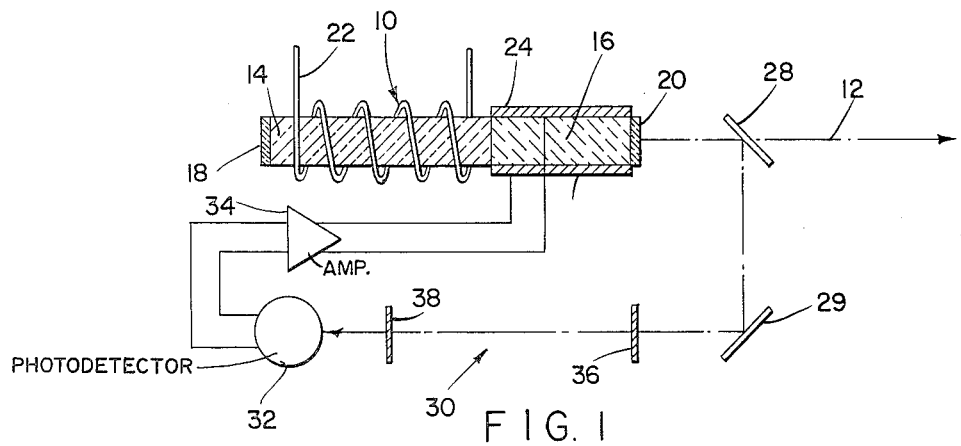
FIG. 1 is a schematic view of a maser generator, the frequency of which is automatically controlled.

With reference now to FIG. 1, there is shown a maser generator of automatically stablized frequency. The system includes a maser unit 10 embodying the present invention for generating coherent characteristic radiation for emission as at 12. Maser unit 10 includes a negative temperature medium 14, a tuning medium 16 and a pair of Fabry-Perot plates 18, 20. A light source 22 is spiralled around negative temperature medium 12 for the purpose of supplying pumping power. A pair of opposed conducting metallic coats 24, 26 are applied to opposed surfaces of tuning medium 16 for the purpose of permitting a desired electric field to be generated therebetween. A semi-transparent mirror 28, which is obliquely disposed across output path 12, and a reflecting mirror 29 to transmit a proportion of the generated radiation as an output and to feed back a proportion of the generated radiation to the automatic frequency monitor now to be described.

This automatic frequency monitor includes a Fabry-Perot interferometer 30 for transmitting a wavelength band of extremely narrow width, a photodetector 32 and an amplifier 34. Interferometer 30 includes a pair of parallel plates 36 and 38, both of which are semi-transparent and sufficiently reflecting to ensure an extremely narrow bandwidth for transmitted radiation. Photodetector 32 is in the form of a photomultiplier, the output of which is a direct function of the radiation received from interferometer 30. This output is applied through amplifier 34 across conductors 24, 26 in such a way as to automatically adjust the refractive index of tuning medium 16 to produce a maximum of transmission through interferometer 30.

The design of Fabry-Perot plates 18, 20 and 36, 38 is conventional in that the inner and outer parallel faces of each plate reflect at least a proportion of the radiation they receive. The thickness of each plate as well as the distance between each pair of plates is chosen so that the radiation reflected thereby is in phase. The periphery of negative temperature medium 14 is advantageously transparent to the pumping energy from source 22 and either transparent to or absorptive of other radiation impinging thereupon. Source 22, for example, includes potassium vapor as its active medium.

In order to keep the frequency of the maser generator constant, the optical path of the tuning medium need not be varied by more than a quarter wavelength. This can be seen by the following analysis. Let the optical thickness of the maser material be $n_1 d_1$ and the optical thickness of the tuning material be $n_2 d_2$. The wavelengths at which the device will operate in the mode perpendicular to the end plate is given by the expression:

$$\lambda = 2\frac{n_1 d_1 + n_2 d_2}{m}$$

where $m$ is a whole number. In an optical maser having, for example, negative temperature medium composed of ruby or $CaF_2$ doped with uranium, or a helium-neon gas mixture, the natural width associated with the transition in which there is maser action is many times the width of any transmission band of the interferometer. Accordingly there are usually several values of $m$ and thus several different wavelengths at which the maser can oscillate. If the material changes temperature, the apparent length of the path between the Fabry-Perot plates will change, as will the wavelength of the output radiation. This can be compensated by changing $n_2$ in the auxiliary medium so that the sum $n_1 d_1 + n_2 d_2$ is constant. The amount by which $n_2 d_2$ must be varied is determined by the value of $m$. By the Pockels effect, the tuning medium can be adjusted depending on the sign of the applied voltage. If $n_1 d_1$ is decreasing, $n_2 d_2$ is increasing. When the value of $n_1 d_1$ becomes so low that $n_1 d_1$ plus the original value of $n_2 d_2$ provides transmission band at order $m-1$, which is closer to the desired wavelength than the band at order $m$, the correction is better applied by negative voltage and the original value of $n_2 d_2$ is reduced until the sum $n_1 d_1 + n_2 d_2$ results in the transmission of the desired wavelength at order $m-1$. Let $\Delta_1$ be the shift of $n_1 d_1$ and $\Delta_2$ be the applied shift of $n_2 d_2$.

$$\lambda_1 = 2\frac{n_1 d_1 + n_2 d_2}{m} = 2\frac{n_1 d_1 + n_2 d_2 - \Delta_1 - \Delta_2}{m-1}$$

$$(m-1)(n_1 d_1 + n_2 d_2) - m(n_1 d_1 + n_2 d_2) - \Delta_1 - \Delta_2 = 0$$

$$(\Delta_1 + \Delta_2) = \frac{n_1 d_1 + n_2 d_2}{m} = \frac{\lambda}{2}$$

The shift required thus is never greater than $\lambda/4$.

Figure 2:
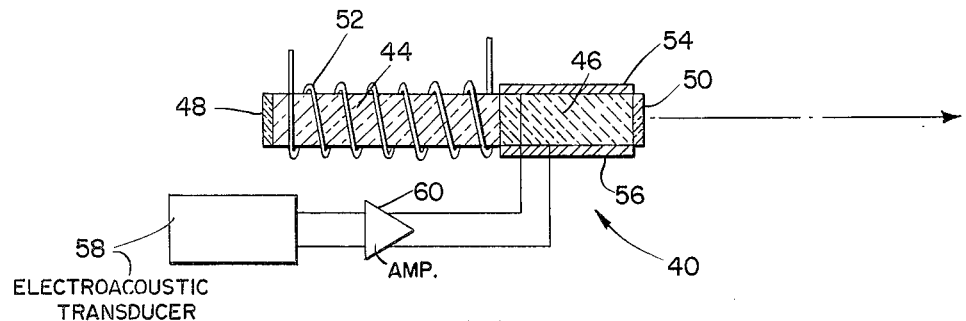
FIG. 2 is a schematic view of a maser generator the frequency of which is modulated in accordance with an input signal.
Figure 3:
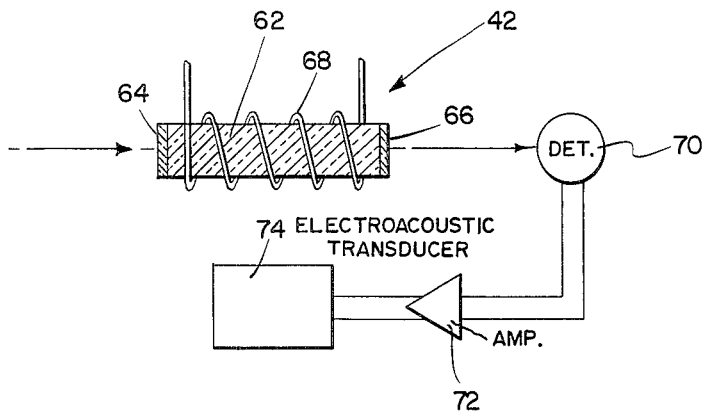
FIG. 3 is a maser detector which discriminates to produce a modulated amplitude output in response to the modulated frequency input.

A communication system embodying the present invention is shown in FIGS. 2 and 3 as including a frequency modulation transmitter 40 and a frequency modulation detector 42. Transmitter 40 includes a negative temperature medium 44 and a tuning medium 46 in series, a pair of Fabry-Perot plates 48, 50 one of which is partially transmitting and both of which are reflecting, a source 52 of pumping energy and a pair of conductors 54, 56 for controlling the effective path length. An electroacoustic transducer 58 responds to an external audio signal in order to produce an output signal. An amplifier 60 applies the resulting signal across conductors 54, 56. Receiver 42 includes a negative temperature medium 62, a pair of Fabry-Perot plates 64, 66 and a source 68 of pumping energy. Both plates 64, 66 are partially reflecting-partially transmitting. A detector 70, amplifier 72 and electroacoustic transducer 74 receive and convert an amplitude modulated signal from plate 66 in response to a frequency modulated signal applied to plate 64. In the foregoing system, the bandwidth permitted by plates 48, 50 is relatively narrow whereas the bandwidth permitted by plates 64, 66 is relatively wide. In consequence, the frequency emitted at any time by transmitter 40 is as a practical matter a single frequency and this frequency stimulates the emission of a like frequency of a relatively wide band in detector 62. Because the intensity of detector 62 varies with frequency as a result of the characteristics of its Fabry-Perot plates, detector 62 serves to convert variations of incident frequency to variations of intensity.

It will be appreciated that a variety of other systems incorporating the frequency controlled negative temperature medium and tuning medium of the present invention are possible. For example, the tuning medium may operate under effects other than the Pockels effect. Also, the negative temperature medium and tuning medium may be one and the same. Accordingly, since certain changes may be made in the above described embodiment of the present invention without departing from the scope of the invention herein involved, it is intended that all matter contained in the above description and shown in the accompanying drawing be interpreted, within the scope of the claims, in an illustrative and not in a limiting sense.

What is claimed is:

1. A system comprising a maser unit having a negative temperature medium and a tuning medium in series, pumping means for said negative temperature medium, first Fabry-Perot means presenting reflective surfaces at the opposite extremities of said series, at least one of said reflective surfaces being partially transparent, control means for varying the index of refraction of said tuning medium, and transducer means including second Fabry-Perot means responsive to a proportion of radiation emitted from said negative temperature means to operate said control means, said transducer means including means for directing radiation from said first Fabry-Perot means to said second Fabry-Perot means, means for producing a signal in response to said radiation received by said second Fabry-Perot means and means for applying said signal to said control means.

2. A system comprising a maser unit having a negative temperature medium and a tuning medium in series, Fabry-Perot means presenting reflective surfaces at the opposite extremities of said series, at least one of said surfaces being partially transparent, a source of pumping power for said negative temperature medium, said tuning medium being composed of a crystalline phosphate material, electrodes at spaced surfaces of said tuning medium, and control means for applying an electrical signal to said electrodes, said electrical signal being of sufficient magnitude to vary the index of refraction of said tuning medium in order to vary the effective optical path of said series.

3. The system of claim 2 wherein said crystalline phosphate material contains ammonium ions.

4. The system of claim 2 wherein said crystalline phosphate material contains potassium ions.

5. The system of claim 2 including auxiliary Fabry-Perot means including transducer means, said transducer means including means for directing radiation from said first-mentioned Fabry-Perot means to said auxiliary Fabry-Perot means, means for producing a signal in response to radiation received by said auxiliary Fabry-Perot means and means for applying said signal to said control means.

6. The system of claim 2 including an electroacoustic transducer for producing said signal.

7. A system for generating electromagnetic radiation by stimulated emission, said system comprising negative temperature medium means and tuning medium means defining an optical path, Fabry-Perot means for resonating stimulated emission radiation at opposite extremities of said optical path, spaced electrode means contiguous with said tuning means, the effective length of said path being variable throughout a range of magnitudes as a function of the index of refraction of said negative temperature medium means and of a range of magnitudes of the index of refraction, of said tuning medium means, pumping means for energizing said negative temperature medium means to generate electromagnetic radiation of a frequency within a range of magnitudes, emission through said Fabry-Perot means of electromagnetic radiation of any selected frequency within said range of magnitudes of frequency being determined by a related one of said lengths within said range of magnitudes of effective length of path, and input means for applying an electrical signal across said electrodes, said electrical signal being variable throughout a range of magnitudes which determine said lengths within said range of magnitudes of effective length of path, whereby the frequency of radiation emitted by said system is controlled by said input means.

8. The system of claim 7 wherein feedback means is provided for so selecting said signal as to maintain constant one of said lengths within said range of magnitudes of effective length of path to provide a constant output frequency.

9. The system of claim 7 wherein modulating means is provided for so varying said signal as to vary the frequency of said emission through said Fabry-Perot means by variation of such lengths within said range of magnitudes of effective path length.

10. A system for controlling the output frequency of a stimulated emission means comprising; means presenting opposed reflecting surfaces, at least one of which is partially transparent and both of which intersect an axis defining an optical path between said surfaces, the output frequency of said stimulated emission means being a function of the length of said path, a negative temperature medium and a tuning medium serially disposed in said path, pumping means for energizing said negative temperature means to a negative temperature condition, a pair of electrodes spaced from each other and contiguous with said tuning medium, means coupled to said electrodes for applying an electrical signal thereto to vary the refractive index of said tuning medium and thereby the length of said path, whereby the output frequency of said stimulated emission means is controlled due to said varying path length.

References Cited by the Examiner
UNITED STATES PATENTS 2,929,922  3/1960  Schawlow et al. _____ 88—61

FOREIGN PATENTS 342,219  1/1931  Great Britain.

OTHER REFERENCES

"Control of Fluorescent Pulsations," Advances in Quantum Electronics. Ed. Singer, Columbia University Press, New York, 1961 (collected papers and discussions presented at the Second International Conference on Quantum Electronics held in Berkeley (U. of Calif.) Mar. 23–25, 1961), pp. 334–341.

JEWELL H. PEDERSEN, *Primary Examiner.*

R. L. WIBERT, *Assistant Examiner.*